Inventor.
Gabriel Tricau.

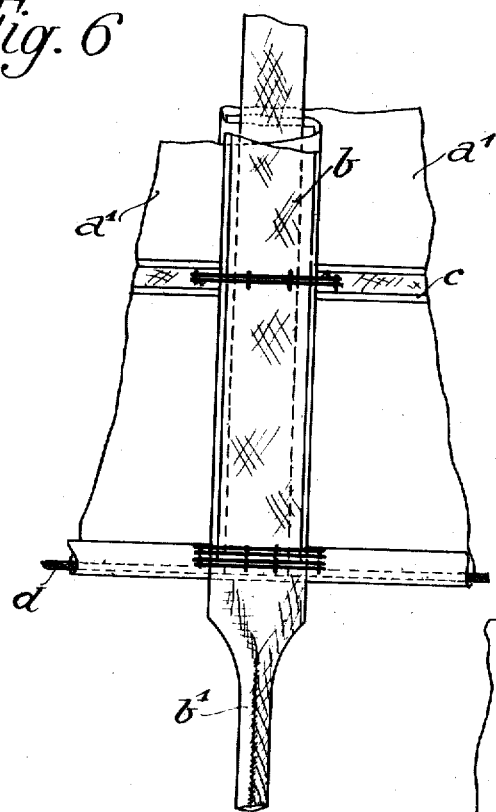
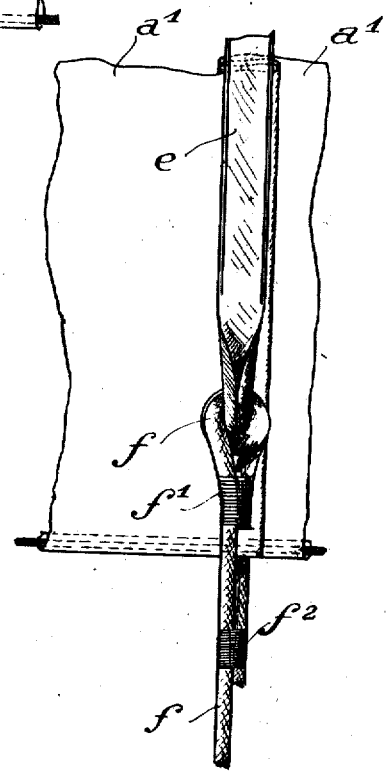

Patented June 7, 1932

1,862,247

UNITED STATES PATENT OFFICE

GABRIEL TRICAU, OF VANVES, FRANCE

PARACHUTE

Application filed May 8, 1930, Serial No. 450,792, and in Luxemburg September 20, 1929.

This invention relates to parachutes.

Experience has proved, that it is at the moment of opening that the covering of a parachute is subjected to the greatest strains, which are sometimes so great as to split the fabric cover or break the supports with which the cover is provided for supporting the weight suspended therefrom.

The purpose of the present invention is to enable parachutes to be constructed which better fulfill the various requirements of practice than hitherto and which, in particular, have a greater resistance, therefore of greater security.

The invention is described with reference to the accompanying drawings in which.

Figure 4:
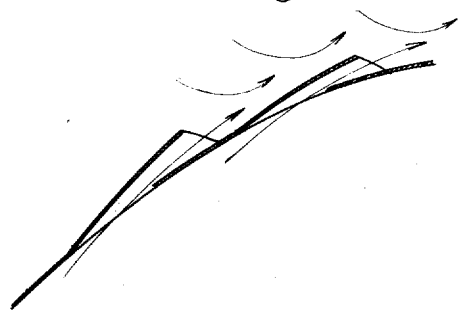

Fig. 4 diagrammatically illustrates the relative position of the panels of a parachute constructed according to a fourth method of construction.

Figure 5:
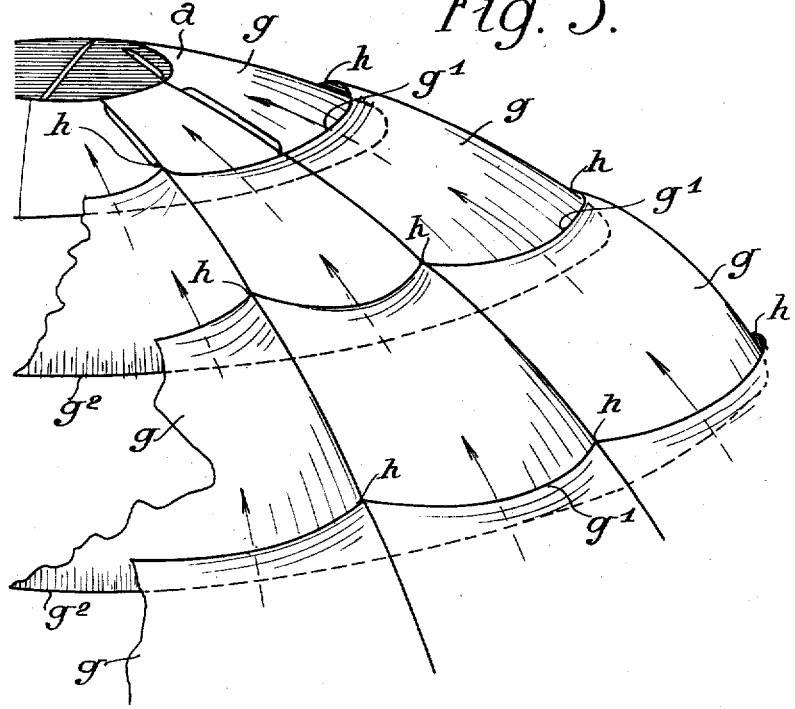

Fig. 5 is a partly perspective view seen slightly from above of a parachute made according to the fourth method of construction.

Figs. 6 and 7 diagrammatically illustrate two methods of securing the supports for the weight carried.

According to the present invention, a parachute is constructed which at the moment of opening is not liable to any risk of its cover tearing, or of its supports breaking, and having a greater stability during working, and a slower falling speed for a given size cover and load.

Figure 1:
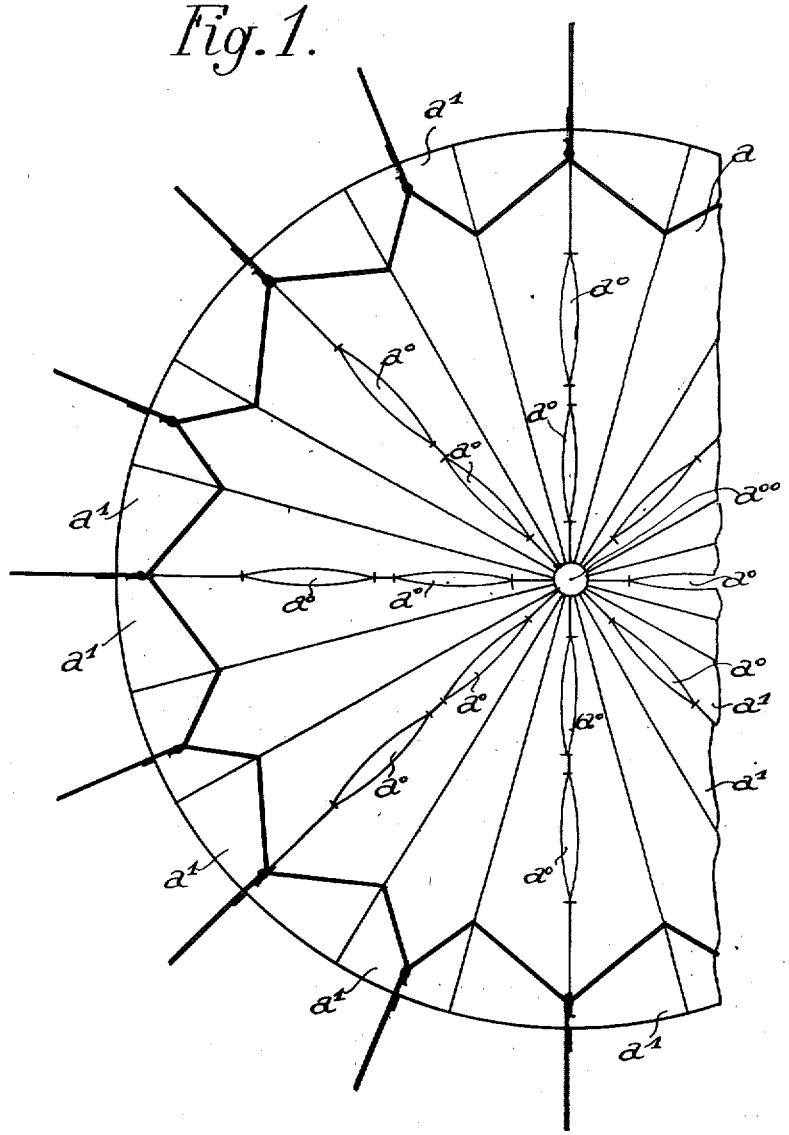
Fig. 1 is a diagrammatic partial plan view showing one form of construction of a parachute cover according to the invention.

The cover $a$ forming the supporting member of the parachute is composed as usual of a plurality of panels $a^1$ of suitable fabric, but, according to the present invention, certain of these panels are not connected at one or more portions of their length thus providing, in the example shown in Fig. 1, two series of midway slits $a^0$.

These slits $a^0$ are preferably provided at their ends with suitable stop points.

As usual there is provided at the top of the cover $a$ an opening $a^{00}$, suitable strengthening elements being arranged and secured on the cover.

The operation is as follows:—

The parachute thrown into the air closed, with its load, drops and as soon as the falling speed attains its maximum, (the resistance of the air also attains its maximum,) the cover opens with violent force, the pressure which it undergoes at that moment is considerable, the slits $a^0$ prevent the full force of this pressure being exerted, as under the influence of the full force said slits open, this reduction of pressure being greater or less according to the number and length of the slits. There is therefore a partial blow through of the air compressed under the cover. The pressure decreasing, the slits close again but re-open if the pressure again increases.

The presence of these slits limits the violence of the shock on the cover at the moment of its opening. Further the parachute has greater stability, the points of exhaust formed by the slits $a^0$ limit the oscillations and even completely absorb them, thus insuring for the parachute and more particularly its load a vertical position during descent.

With a view to obtaining an easier and more economical manufacture, a piece of suitable fabric is cut into a certain number of panels $b$, the length of which is the function of the width of said fabric and of the diameter to be given to the parachute.

The selvedges of these panels are preferably bound with strengthening webbing and the panels are joined, two by two, in the direction of the warp, leaving slits, the number of which may vary, three slits being shown in the example illustrated.

The panels $b$ are so joined that the opening of the slits are directed towards the centre of the parachute.

When all these panels are joined a square is formed and on the four sides thereof panels $c$ are joined, said panels $c$ being cut in the form of arcs of circles so that a circular parachute is finally obtained.

In joining the panels $c$ with the panels $b$, slits are left which must also be directed towards the centre of the parachute.

An opening is cut at the centre and strengthened as usual, which provides means to create a zone of very great and very active depression the effect of which is to increase in very high proportions the bearing force of the parachute.

Figure 3:
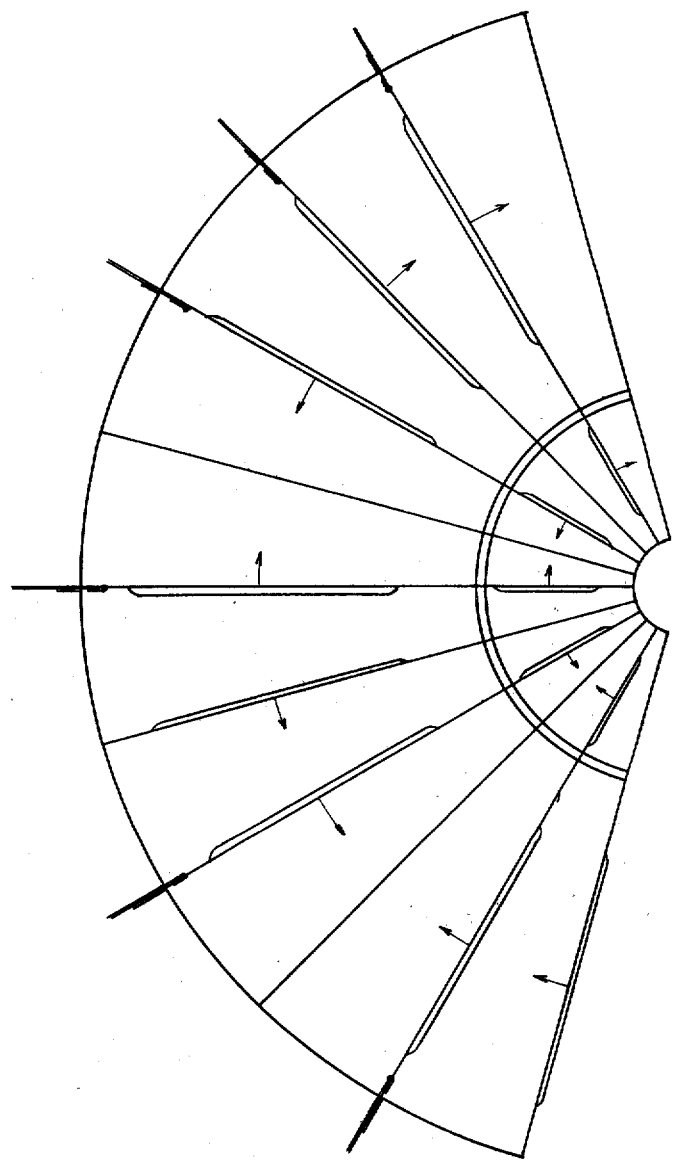

If the cover is constructed, as usual, with triangular panels as shown in Fig. 3, it is preferable to join the panels selvedge to selvedge and bias to bias instead of selvedge to bias, as is usually done.

The seams of the straight edges have one or more slits which are cut in alternate sides so that the currents of air thus formed each sweep over one panel and then unite above the seam of the bias sides. All or some of the bias seams may also be provided with slits.

With a view to channelizing the current of air, created on the covering, over a considerable distance, in order to increase the amount of the depression above each panel, and consequently increase the supporting power of each panel, the following arrangement is adopted:—

For constructing a parachute $a$ of the ordinary umbrella type, a plurality of circular pieces of fabric are cut, spherical rings $g$ being thus obtained. The edges $g^1$ and $g^2$ of these rings $g$ are bound with a suitable webbing, the lower edge $g^2$ being wrinkled (that of the greater diameter) and the upper edge $g^1$ is left at its original length.

The rings are joined as shown in Figs. 4 and 5 making each ring considerably overlap the ring above it and are secured together by joining them at certain points $h$ of their seams.

For the rings of small diameter, that is to say those nearest to the summit of the parachute, these joining points can only be situated at every other seam, the rings farthest from the summit may be joined at every seam or may even be joined between the seams.

If desired the panels can be arranged to entirely overlap each other whereby a practically double parachute is obtained.

In order to avoid the drawbacks of the usual methods of attachment of the supports to the cover, by means of a knot, which methods of attachment cause the supports to lose a considerable amount of strength owing to the fact of the fraying produced by the sliding of the said knots over each other at the moment of the maximum strain (at the opening of the cover) I provide supports comprising webbing $b$ (Fig. 6) sewn in suitable manner on the cover $a$ and which is preferably also secured on the cover at points involving the use of the strengthening elements of the cover, such, for instance, as the circumferential strengthening webbing $c$ and the webbing $d$ of the leading edge.

The part $b^1$ of the support $b$ which is situated between the cover and the load can be folded or rolled as shown in Fig. 6 and kept in that state by any appropriate means, by sewing, or whipping, for instance.

With a view to using the ordinary round supports, the method of attachment shown in Fig. 7 may be used. The strength of the attachement webbings $e$ is considerably lower than that of the support $f$ composed of a rope; or preferably of a cord not twined with hemp and whipped with cotton.

In the case of a very violent shock, the attachment webbing $e$ being weaker than the support, may be broken, in which case the support $f$, one end of which passes above and the other below the leading edge, thus embracing the strengthening element $d$, falls astride on the latter which by this time does not have to support the shock suffered by the braid $e$, the support $f$ is simply slightly lengthened, which is negligible. If the support were broken at its point of attachment, it would be still held by the leading edge.

The system of attachment in question does not include any knot.

Assuming that it is more advantageous to reinforce a short webbing rather than a long support, the attachment shown in Fig. 7, is formed as follows:—

The support $f$ is passed into the loop $e^1$ of the webbing $e$ for instance twice or three times in succession, so that it may not slip; the two strands of the support $f$ are firmly sewn then wired across at $f^1$. One of the strands is then passed into the hole formed above the leading edge, then both strands are firmly sewn and wired across at $f^2$.

Figure 2:
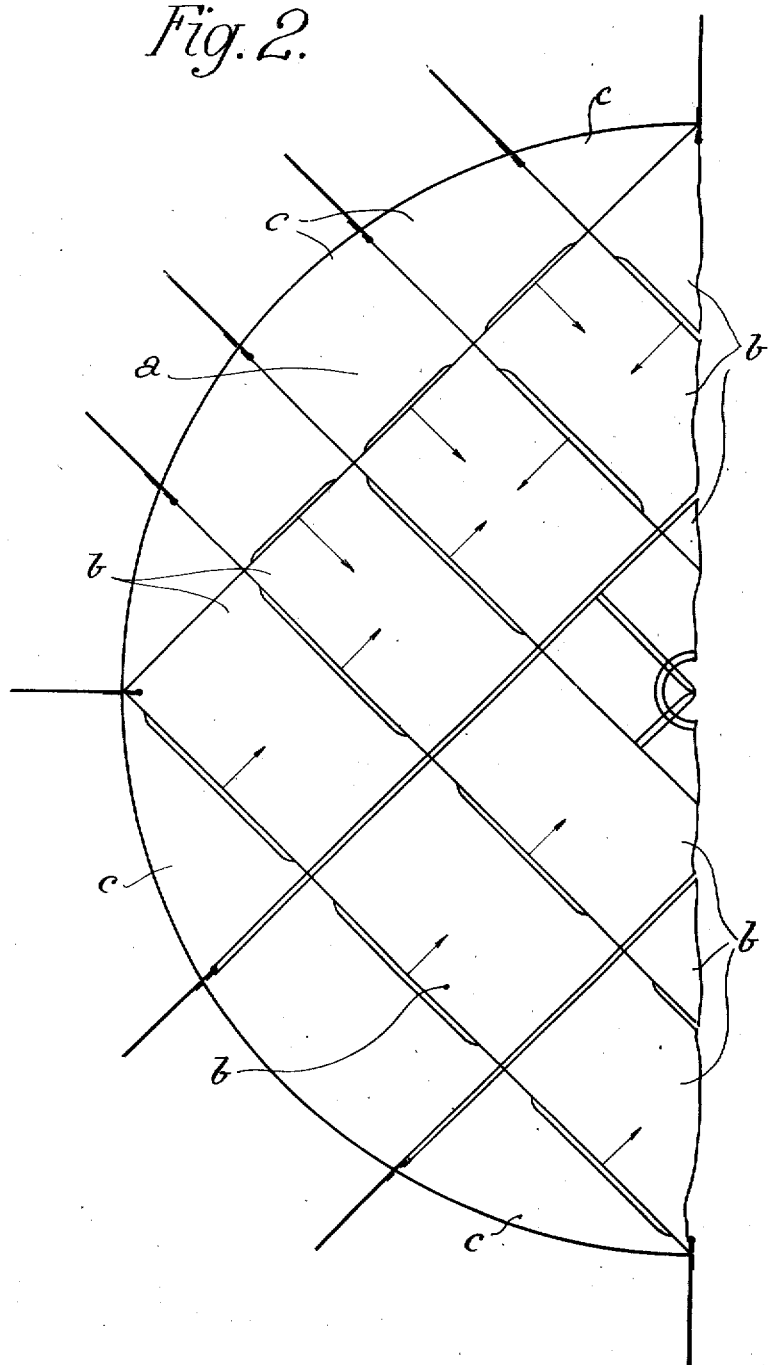
Figs. 2 and 3 are similar views to Fig. 1 showing further forms of construction respectively.

In the method of construction shown in Fig. 2 the supports are arranged as in the method of construction of Fig. 1, except that those attached to the four corners of the original square are simply passed into a hole formed above the leading edge.

In order to increase the stability and also to prevent oscillations during descents, I arrange between the supports, succeeding each other but situated in the same sector of the circumference of the parachute base, polygonal elements, for instance, of material such as a light fabric, which facing the wind decrease the extent of oscillation.

These elements are secured reaching to the leading edge of the cover or lower down between the latter and the load.

From the above description it will be understood that arranging longitudinal or lateral slits in the cover enables the resistance of parachutes to be increased. These slits acting as safety valves which reduce the shock at opening, the bearing force of said parachutes being increased also by creating, by means of these slits, a zone of depression above the upper surface of the cover.

What I claim as my invention and desire to secure by Letters Patent of the United States is:—

In a parachute, a plurality of spherical rings of fabric forming the suspensory cover, said rings being wrinkled at their lower edge (that of greater diameter), the upper edge being left at its full length, said upper edge of the lower ring overlapping the lower edge of the upper ring and said rings being secured together only at certain points so as to provide openings in the cover directed towards the pole of the cover.

GABRIEL TRICAU.